Patented Aug. 28, 1934

1,971,871

UNITED STATES PATENT OFFICE 1,971,871

PROCESS FOR THE PREPARATION OF INULIN

Howard S. Paine, Ralph M. Kingsbury and Elias Yanovsky, Washington, D. C., dedicated to the free use of the Public No Drawing. Application August 10, 1932, Serial No. 628,224

2 Claims. (Cl. 127—34)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government, for governmental purposes, without payment to us of any royalty thereon.

We hereby dedicate the invention herein described to the free use of the public, to take effect upon the granting of a patent to us.

This invention relates to the manufacture of inulin at a cost which will permit its use for practical purposes. Carbohydrate reserve material is stored in the roots of plants, in most cases in the form of starch. Some plants, however, contain inulin instead of starch. Inulin is a complex carbohydrate, which on hydrolysis with acids produces the sugar levulose, while starch under the same conditions produces glucose.

Ever since inulin was discovered various opinions have been expressed as to the suitability of inulin in the diet of normal individuals, its value in the diet of diabetics, and its various other practical applications. The reason for discrepancy in the conclusions of numerous investigators is due primarily to the difficulty in obtaining sufficient amounts of inulin for investigations. The usual method for obtaining inulin from plant material (dahlia bulbs, chicory roots, dandelion roots and other inulin-containing plants) is essentially as follows: The roots are extracted with hot water; the impurities are removed by the addition of lead acetate; the excess of lead is removed by passing hydrogen sulphide into the solution; the solution is then neutralized with alkali, decolorized with suitable decolorizing carbon, and concentrated in vacuo; to the concentrated solution alcohol is added, and crystallization is allowed to take place in the refrigerator.

The use of lead, hydrogen sulphide, alcohol and low temperature makes the process rather expensive, and this explains the limited supply of inulin and its high price, making the product prohibitive even for investigational purposes.

Our process described below eliminates all the disadvantages enumerated and makes the process practical not only for production of inulin in the amounts needed for research, but also for its production on a commercial scale in case there is a demand for it.

Before describing our process in detail, we want it clearly understood that our process is applicable not only to the root cited in the specific instance given below, but it can be applied to most inulin-containing plants, and that it works equally well with fresh roots and roots from which most of the moisture has been removed through proper drying.

Our process is essentially as follows: The inulin-containing parts of the plant (e. g., roots of chicory), whether fresh or dry, are ground and extracted with hot water. Either tap water or water made slightly alkaline with lime can be used for extraction. After removing the liquid (e. g., by pressing) the extraction is repeated once more. The combined liquid is treated with slacked lime, or any other suitable basic oxide, hydroxide or carbonate, the amount used depending upon the solids content of the material to be extracted. After removing the excess of lime and the precipitated impurities (e. g., by filtering), the liquid is treated with gaseous carbon dioxide to remove the dissolved lime and further impurities. The carbonation is continued until the liquid is practically neutral to phenolphthalein, slightly on the alkaline side. The precipitate is removed (e. g., by filtration) and the liquid is concentrated in a vacuum still to about 50% total solids. The heavy liquid is heated to about 90°–95° C. On cooling to room temperature, the inulin separates out. It is purified by dissolving it in about a weight and a half to two weights of hot water, and treating it, if necessary, with decolorizing carbon. On cooling to room temperature inulin separates out as practically white crystalline material.

As a specific instance of how the process can be conducted the following procedure is described in detail:

Two hundred pounds (200#) of dried chicory root (about 12% moisture) are ground to a small grain and extracted twice with hot water (about 80° C.). Approximately 100 gallons of liquid are obtained after two pressings. The liquid so obtained is allowed to cool to 40°–50° C., and 8 pounds of anhydrous lime are slacked and stirred into the liquid. The precipitate is filtered off and the liquid is treated with carbon dioxide gas until it is only slightly alkaline, pH=8 to 9. The filtration after treating with lime may be omitted, and the liquid with the precipitate in it may be treated with carbon dioxide and the total precipitate filtered. After filtering off the precipitate, the liquid is transferred to a vacuum still and boiled down to a consistency of about 50% solids. The heavy liquid is brought to a temperature of 90°–95° C. After cooling to room temperature the inulin is separated by filtration. About 25 pounds of inulin is obtained and a further quantity separates out on allowing the mother liquor to stand for a longer time. The inulin may be recrystallized in the following manner:

Twenty-five pounds (25#) of crude inulin are dissolved in about 3 to 4 gallons of hot distilled water, and ¼ to ½ pound of active decolorizing carbon is added. After filtering, the inulin separates out. The separation is complete overnight at room temperature. Fifteen pounds (15#) or more of pure inulin is the yield on recrystallization.

Having fully disclosed our discovery, we claim as our invention:

1. The process of preparing solid inulin which comprises treating an inulin-containing plant water extract with slacked lime, removing the excess lime and precipitated impurities by filtering, treating the remaining liquid with gaseous carbon dioxide to remove the dissolved lime and impurities until the liquid is slightly alkaline, filtering the liquid, concentrating the liquid to about 50% solids, heating the liquid to a temperature of about 90° to 95° C., cooling the liquid to room temperature and separating the resulting inulin from the liquid by filtering.

2. The process of preparing solid inulin which comprises treating an inulin-containing plant water extract with slacked lime, removing the excess lime and precipitated impurities by filtering, treating the remaining liquid with gaseous carbon dioxide to remove the dissolved lime and impurities until the liquid is slightly alkaline, filtering the liquid, concentrating the liquid to about 50% solids, heating the liquid to a temperature of about 90° to 95° C., cooling the liquid to room temperature and separating the resulting inulin from the liquid by filtering, purifying the inulin thus obtained by dissolving one part inulin in 1½ to 2 parts of hot water, treating this solution with decolorizing carbon in the usual way, cooling the solution to room temperature and removing the resulting crystallized inulin by filtering.

HOWARD S. PAINE.
RALPH M. KINGSBURY.
ELIAS YANOVSKY.